(12) United States Patent
Tran et al.

(10) Patent No.: US 6,598,132 B2
(45) Date of Patent: Jul. 22, 2003

(54) BUFFER MANAGER FOR NETWORK SWITCH PORT

(75) Inventors: Toan D. Tran, Sunnyvale, CA (US); Robert J. Divivier, San Jose, CA (US); Siyad Ma, Palo Alto, CA (US)

(73) Assignee: Zettacom, Inc., Santa Clara, CA (US)

( * ) Notice: Subject to any disclaimer, the term of this patent is extended or adjusted under 35 U.S.C. 154(b) by 187 days.

(21) Appl. No.: 09/908,616

(22) Filed: Jul. 18, 2001

(65) Prior Publication Data

US 2003/0084246 A1 May 1, 2003

(51) Int. Cl.<sup>7</sup> .............................................. G06F 12/00
(52) U.S. Cl. ....................................... 711/154; 711/122
(58) Field of Search .................................. 711/122, 154

(56) References Cited

U.S. PATENT DOCUMENTS

| | | | | |
|---|---|---|---|---|
| 5,206,834 A | * | 4/1993 | Okitaka et al. | 365/239 |
| 5,978,935 A | * | 11/1999 | Kim et al. | 714/42 |
| 5,982,425 A | * | 11/1999 | Allen et al. | 348/231.9 |
| 6,141,055 A | * | 10/2000 | Li | 348/446 |

\* cited by examiner

*Primary Examiner*—Reba I. Elmore
(74) *Attorney, Agent, or Firm*—Daniel J. Bedell; Smith-Hill and Bedell (57) ABSTRACT

A traffic manager for a network switch port includes a buffer memory and a buffer manager for writing incoming cells into the buffer memory and for thereafter reading the cells out of the buffer memory and forwarding them. The traffic manager also includes a queue manager for determining an order in which the buffer manager is to forward a set of cells stored in the buffer memory. The queue manager supplies the buffer manager with a sequence of pointers, each pointer referencing a separate cell of the set of cells, with the sequence of pointers being ordered to indicate an order in which the buffer manager is to forward the set of cells. After receiving the pointer sequence, the buffer manager changes the order of pointers in the pointer sequence to optimize a rate at which it can read the cells out of the buffer memory. The buffer manager reads the cells out of the buffer memory in an order indicated by the changed pointer sequence and thereafter forwards the cells read out of the buffer memory in the order in which the queue manager determined the cells are to be forwarded.

19 Claims, 5 Drawing Sheets

BUFFER MANAGER FOR NETWORK SWITCH PORT

BACKGROUND OF THE INVENTION

1. Field of the Invention

The present invention relates in general a buffer memory for a network switch port for receiving, storing and thereafter reading out and forwarding cells derived from network data transmissions, and in particular to a buffer manager that selects an order in which cells are written into and read out of buffer memory banks in a manner that optimizes memory access rates.

2. Description of Related Art

A network switch routes data transmissions such as ethernet packets between network buses. A typical network switch includes a set of input ports for receiving packets arriving on the buses, a set of output ports for forwarding packets outward on the buses, and a switch fabric such as a crosspoint switch for routing packets from each input switch port to the output switch ports that are to forward them.

Network switch input and output ports often include buffer memories for storing packets until they can be forwarded thorough the switch fabric or outward on a network bus. Since packets may be of variable size, an input port may convert each packet arriving on a network bus to a sequence of cells of uniform size which can be efficiently stored in uniformly-sized buffer memory storage locations. The input port stores the cells of each sequence in its buffer memory until it can forward them through the switch fabric to one of the switch's output ports. The output switch port stores the cells in its buffer memory and later reads them out, reassembles them into the packet from which they were derived, and then forwards the packet outward on another network bus.

A network switch port often uses one or more synchronous dynamic random access memories (SDRAMs) to implement its buffer memory because large SDRAMs capable of storing many cells are inexpensive. An SDRAM may include more than one memory bank, and the switch port's buffer manager can read or write access a cell stored at an address within any one of those memory banks, for example, in four cycles of a system clock signal. Also such an SDRAM may require, for example, an extra two cycles recovery time when switching from a read access to a write access or vice-versa, even when the accesses are to different banks. However this does not mean that the buffer manager can read or write access the SDRAM every four or six clock signal cycles. Once the buffer manager read or write accesses any address of an SDRAM memory bank, the buffer manager must allow that bank a certain amount of additional time to recover (precharge) before the buffer manager can read or write access any address of that SDRAM bank again. For example an SDRAM having a four cycle access time may require an additional six clock cycles to recover after a read access and an additional nine clock cycles to recover after a write access. Thus even though an SDRAM may have a four or six cycle access time, a buffer manager could repeatedly read access the same SDRAM bank only once every ten clock signal cycles and repeatedly write access the same SDRAM bank only once every 13 clock signal cycles.

When such an SDRAM has, for example, four memory banks A–D, a buffer manager could read or write access the SDRAM once every one four or six clock cycles if it were able to avoid read or write accessing any one bank more than once every 13 clock cycles. However since the cells stored in the buffer memory of a network switch are parts of sequences of cells derived from packets, the buffer manager must forward the cells of each sequence from the buffer memory in proper sequential order so that they can be properly reassembled into packets. That particular order may not be optimal with respect to rate at which they can be read out of the buffer memory. Since a conventional buffer manager for a network port would not be able to control the order in which it accesses the banks of such an SDRAM so as to optimize access rates, it would have to limit accesses to once every 13 clock cycles to make sure that it did not write access the same memory bank too frequently.

What is needed is a buffer manager for a network switch port that can order buffer memory bank accesses to optimize the rate at which it read and write accesses the buffer memory, but which nonetheless forwards cells read out of memory in an appropriate sequential order regardless of the order in which they were read out of the buffer memory.

BRIEF SUMMARY OF THE INVENTION

A network switch port includes a buffer memory for storing cells derived from network data transmissions and a buffer manager for writing incoming cells into the buffer memory and for thereafter reading the cells out of the buffer memory and forwarding them elsewhere. The buffer memory includes several memory banks, and the rate at which the buffer manager is able to read and write accesses the buffer memory depends on the order in which the buffer manager read and write accesses those memory banks.

The switch port also includes a queue manager for determining an order in which the buffer manager is to forward cells stored in the buffer memory. To tell the buffer manager the order in which to forward a set of cells stored in the buffer memory, the queue manager supplies the buffer manager with a first sequence of read pointers, wherein each read pointer references a separate cell of the set of cells to be read out of the buffer memory. The queue manager orders the read pointers within the first sequence to indicate the order in which the buffer manager is to forward the cells.

In accordance with one aspect of the invention, the buffer manager processes the first sequence to produce a second sequence including all of the read pointers of the first sequence along with a set of write pointers. Each write pointer points to a separate address of buffer memory that is available for receiving an incoming cell. The buffer manager then read and write access the buffer memory in the order indicated by the write and read pointers of the second sequence.

In accordance with another aspect of the invention, the buffer manager orders the read and write pointers of the second sequence to optimize a rate at which it can read and write access buffer memory's memory banks. Hence the read pointers do not necessarily appear in the second sequence in the same order that they appear in the first sequence. The buffer manager therefore does not necessarily read cells out of the buffer manager in the order in which the queue manager determined they are to be forwarded. However as it reads cells out of the buffer memory, the buffer manager stores them in a set of registers. The buffer manager thereafter reads the cells out of the registers and forwards them from the switch port manager in the order in which the queue manager determined they should be forwarded.

Thus the buffer manager orders buffer memory bank read and write accesses to optimize the rate at which it can read and write accesses the buffer memory, but nonetheless forwards the cells it reads out of the buffer memory in the appropriate sequential order specified by the queue manager.

It is accordingly an object of the invention to provide a system for optimizing the speed with which a buffer manager reads and write accesses cells stored in a buffer memory.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

DETAILED DESCRIPTION OF THE INVENTION

Network Switch

Figure 1:
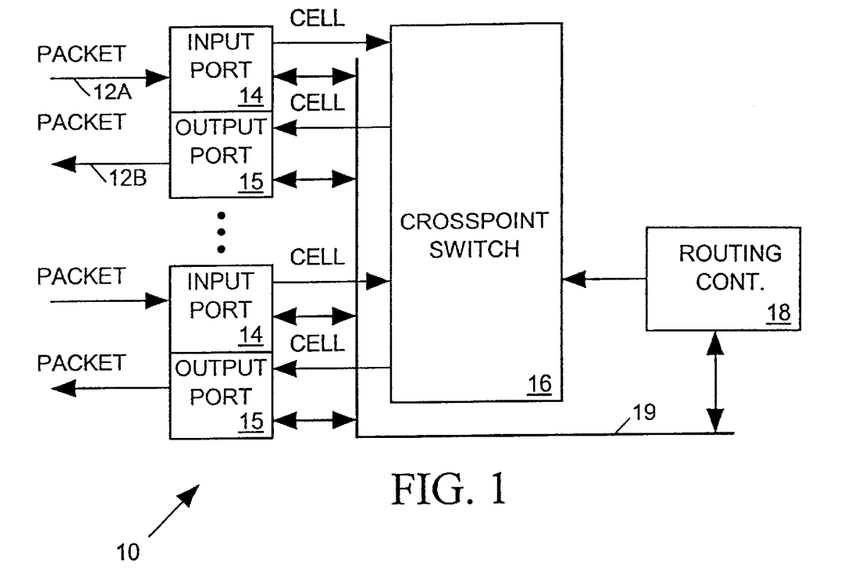
FIG. 1 illustrates a network switch in accordance with the invention for routing network packets between network buses.

FIG. 1 illustrates a network switch 10 for routing network transmissions (packets) between a set of network buses 12A and 12B. Network switch 10 includes input switch ports 14, output switch ports 15, a crosspoint switch 16, and a routing control circuit 18. Each input switch port 14 receives incoming packets arriving on a separate input bus 12A and each output port 15 forwards outgoing packets on a separate output bus 12B. Crosspoint switch 16 selectively provides signal paths between input switch ports 14 and output ports 15 in response to control data from routing control circuit 18 based on routing requests from input switch ports 14. Routing control circuit 18 receives the routing requests from input ports 14 via a bus 19 and also communicates with output ports 15 via bus 19 to determine when they are ready to accept cells from an input port.

Incoming data transmissions (packets) arriving on buses 12A may be of any of a variety of formats such as, for example, variable length ethernet packets. Each input switch port 14 converts each incoming packet to a sequence of one or more "cells" of uniform size and format, and stores each cell in an internal buffer memory. Based on information included in a header of each packet arriving on an input bus 12A, the input switch port 14 that receives the packet determines which output switch port 15 must forward the packet outward on one of outgoing buses 12B toward its intended destination. The receiving input switch port 14 thereafter requests routing control circuit 18 to establish a signal path through crosspoint switch 16 to the appropriate output switch port 15. When routing control circuit 18 grants the request, the receiving input switch port 14 sequentially forwards the sequence of cells derived from the packet to the forwarding output switch port 15 via crosspoint switch 16. That output input switch port 15 stores the cell sequence in its own buffer memory as they arrive. After receiving all of the cells derived from the incoming packet, the output switch port 15 reads the cell sequence out of its buffer memory, reassembles the packet from the cell sequence and forwards the packet outward on one of outgoing network buses 12B.

Switch Ports

Figure 2A:
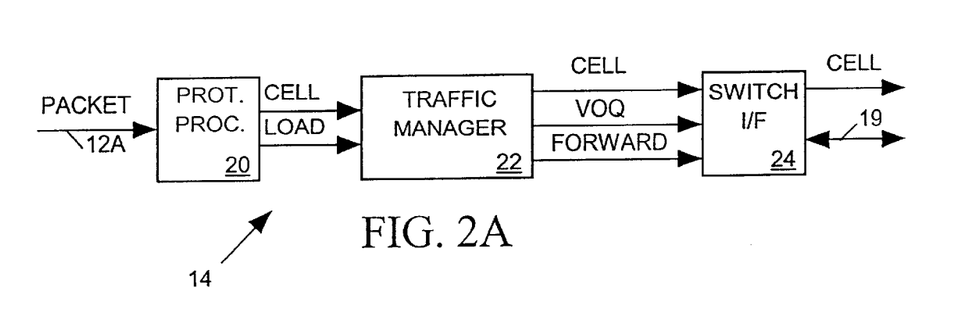
FIG. 2A illustrates one input switch port of FIG. 1 in more detailed block diagram form.

FIG. 2A illustrates one input switch port 14 of FIG. 1 in more detailed block diagram form. Switch port 14 includes a protocol processor 20 for converting each incoming packet arriving on bus 12A into a sequence of cells of uniform length. As protocol processor 20 produces each cell of a sequence, it pulses a LOAD signal input to a traffic manager 22 to indicate that a CELL is available. Traffic manager 22 then stores the cell in an internal buffer memory. Traffic manager 22 also determines from data included in each arriving packet's header which output switch port 15 is to receive the cell sequence derived the packet, reassemble the packet and then forward the packet outward from network switch 10. Traffic manager 22 also determines an order in which to forward cell sequences to output ports 15 based on forwarding priority and other considerations. When traffic manager 22 determines it is time to forward a cell sequence stored in its internal memory, it reads the cells out of its buffer memory and forwards them to a switch interface circuit 24 using a FORWARD signal to indicate when switch interface circuit 24 is to accept each cell. As it provides each cell to switch interface circuit 24, traffic manager 22 also provides "virtual output queue" (VOQ) data identifying the particular one of output ports 15 (FIG. 1) that is to receive the cell. Switch interface circuit 24 maintains a set of queues for holding cells until they can be forwarded to the output ports 15, each cell queue corresponding to a separate one of output ports 15. Switch interface circuit 24 stores each cell arriving from traffic manager 22 in the queue identified by the VOQ data accompanying the cell until it can obtain a signal path through crosspoint switch 16 to the associated output port via crosspoint switch 16. When a cell queue associated with any port 15 is not empty, switch interface 24 sends a routing request to routing control circuit 18 via bus 19 to obtain a signal path to that output switch port 15 and thereafter forwards cells from that cell queue to that output switch port 15 via that signal path.

Figure 2B:
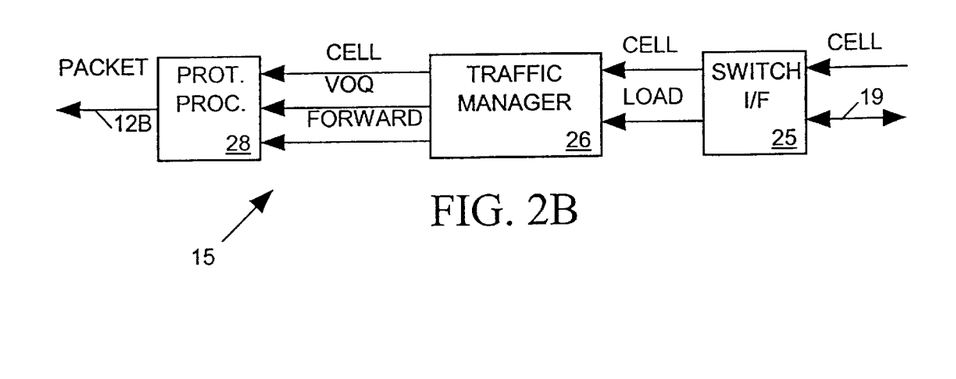
FIG. 2B illustrates one output switch port of FIG. 1 in more detailed block diagram form.

FIG. 2B illustrates one output switch port 15 of FIG. 1 in more detailed block diagram form. When its switch interface 25 receives cells from crosspoint switch 16 it forwards them to a traffic manager 26, pulsing a LOAD signal input to indicate when each cell is available. Traffic manager 26 stores the cell sequence in an internal cell memory and thereafter forwards the cell sequence to a protocol processor 28 using a FORWARD signal to indicate when each cell is available. Protocol processor 28 then reassembles the packet from the cell sequence and forwards it outward on the outgoing network bus 12B. Traffic manager 26 also supplies VOQ data to protocol processor 28 with each cell of a sequence derived from a packet. That VOQ data may, for example, identify a particular virtual channel of bus 12B through which protocol processor 28 is to forward the packet it recreates from the cell sequence.

Traffic Manager

Figure 3:
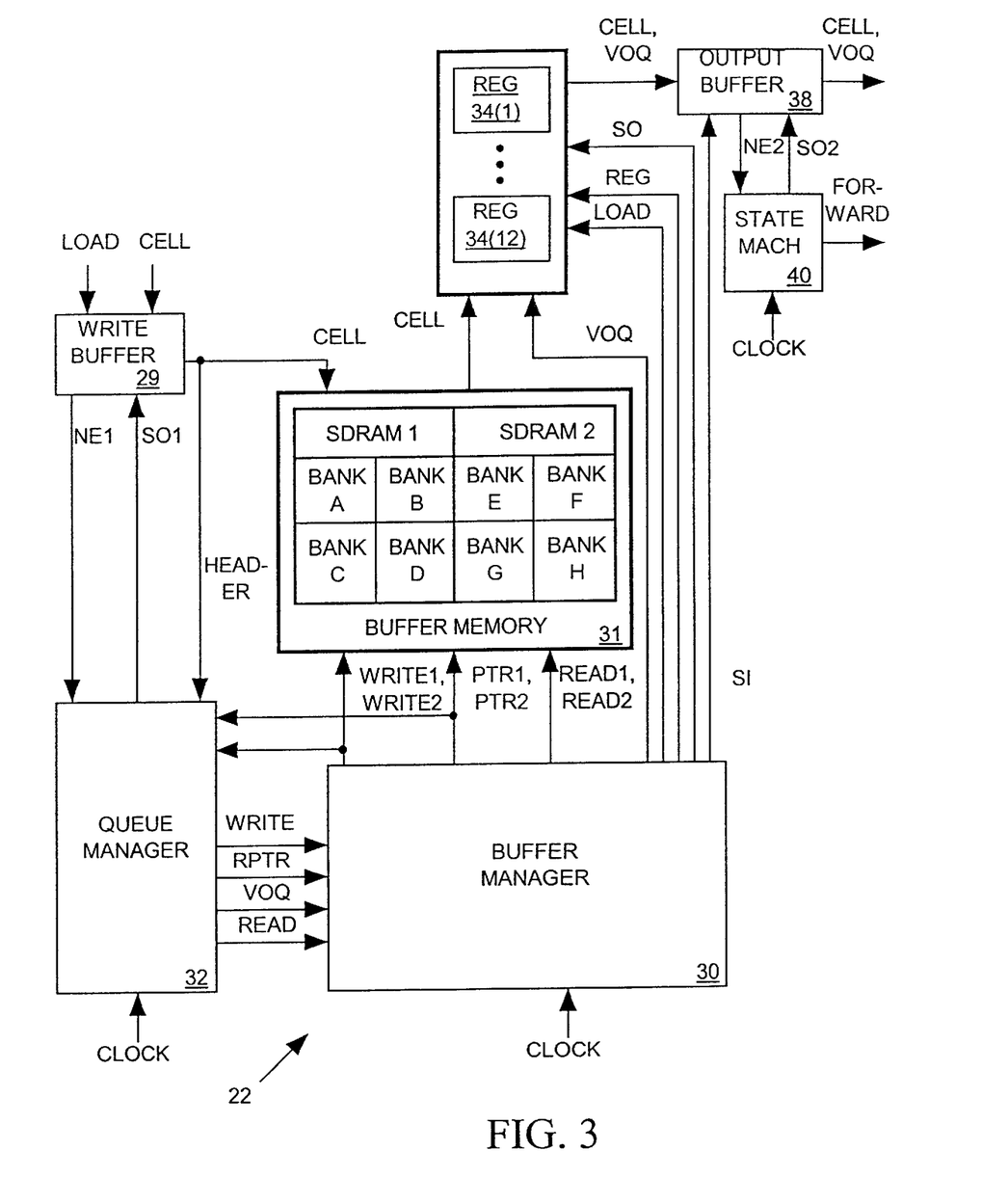
FIG. 3 illustrates a traffic manager of FIG. 2A in more detailed block diagram form.

FIG. 3 illustrates the input switch port's traffic manager 22 of FIG. 2A in more detailed block diagram form. (The output port's traffic manager 26 of FIG. 2B is generally similar in design and operation.)

Traffic manager 22 includes a first-in/first-out (FIFO) write buffer 29 for responding to each LOAD signal pulse from protocol processor 20 (FIG. 2A) signaling the arrival of an incoming cell to be written to buffer memory 31 by shifting in the incoming cell. When write buffer 29 is not empty it provides its longest stored cell at its output and asserts a "not empty" signal NE1 input to a queue manager 32. Queue manager 32 responds to the NE1 signal by looking at a header included in the cell appearing at the buffer's output containing information about the packet from which the cell was derived. Queue manager 32 determines from the header information included in the cell whether the cell is derived from a packet that may be validly forwarded by the network switch. If the cell can be forwarded, the header information tells queue manager 32 which output port 15 is to receive and forward the packet, and indicates the cell's relative forwarding priority.

When queue manager 32 decides from the header of the cell at the output of write buffer 29 that the switch port is not to forward the cell, it sends a shift out signal (SO1) to write buffer 29 telling it to shift out (discard) the cell and to provide a next longest stored cell as its output.

However when queue manager 32 decides from the cell's header that the cell at the output of write buffer 29 is valid and can be forwarded by the switch port, it asserts a WRITE signal input to a buffer manager 30 to indicate that a valid cell is available at the output of write buffer 29 and should be written into a storage location of buffer memory 31. Buffer manager 30 thereafter writes that cell into a selected address of a buffer memory 31 formed by a pair of SDRAMs (SDRAM 1 and SDRAM 2), each implementing a different portion of the buffer memory address space. To write the cell into SDRAM 1, buffer manager 30 supplies an address pointer input PTR1 to SDRAM 1 indicating an address to which the cell is to be written and then pulses a WRITE1 signal to tell SDRAM 1 to store the cell into that address. Similarly to write the cell into SDRAM 2, buffer manager 30 supplies an address pointer input PTR2 to SDRAM2 and then pulses a WRITE2 signal to tell SDRAM 2 to store the cell into the address referenced by PTR2. When buffer manager 30 pulses the WRITE1 or WRITE2 signal, Queue manager 32 remembers the address (PTR1 or PTR2) of the cell and information included in the cell's header, and then pulses the SO1 signal to tell write buffer 29 to shift out that cell and provide a next longest stored cell at its output. When write buffer 29 is not empty it continues to assert the NE1 signal, thereby causing queue manager 32 to signal buffer manager 30 to initiate another write operation.

Queue manager 32 remembers the buffer memory addresses and header information of all cells stored in SDRAMs 1 and 2 because it has to tell buffer manager 30 when to later forward each cell to switch interface 24 of FIG. 2A. The header information helps queue manager 32 to determine which cells in SDRAMs 1 and 2 form the cell sequence associated with each packet and which output port is to receive each cell. Queue manager 32 determines an order in which cells stored in buffer memory 31 are to be forwarded to the switch interface circuit 24 based the cell's order within the packet sequence to which it belongs and on the packet's forwarding priority.

When queue manager 32 determines that a particular cell stored at some address of buffer memory 31 is to be read out and forwarded to switch interface 24, the queue manager transmits a read pointer RPTR referencing the buffer address of that cell to buffer manager 30 along with VOQ data referencing the output port 15 (FIG. 1) that is to receive the cell. Queue manager 32 then pulses a READ signal telling buffer manager 30 that valid RPTR and VOQ data are available.

In accordance with the invention, buffer manager 30 organizes buffer memory accesses into successive access periods. In the embodiment of the invention described herein, each access period lasts for 60 cycles of a system clock signal (CLOCK). As queue manager 32 sends RPTR/VOQ pairs to buffer manager 30, the buffer manager stores them in an internal FIFO buffer. During each 60 cycle access period, buffer manager 30 reads up to 12 of the longest stored RPTR/VOQ data pairs out of the FIFO buffer and determines an order in which it can most rapidly read them out of buffer 31 and also determines an order in which to write cells currently residing in write buffer 29 into buffer memory 31. Then during a subsequent 60 cycle period, buffer manager 30 writes cells to and reads cells from buffer memory 31 in that order.

The order in which queue manager 32 sends the sequence of up to 12 RPTR/VOQ data pairs to buffer manager 30 indicates the order in which queue manager 32 has determined that the stored cells they reference are to be forwarded to switch interface 24 of FIG. 2A. However the order in which buffer manager 30 actually reads those cells out of buffer memory 31 during a 60 cycle access period may not be the same order in which queue manager 32 determined those cells should be forwarded from the switch port. Buffer manager 30 chooses another order in which to read access those cells during the 60 cycle period, and an order in which to also write access various addresses of buffer memory 31 during that 60 cycle period, as to maximize the rate at which it can read and write access the buffer memory.

SDRAM 1 includes four banks A–D and SDRAM 2 has four memory banks E–H, and the order in which buffer manager 30 read and writes to the various memory banks of each SDRAM influences the rate at which it can read and write to the SDRAMs. In the embodiment of the invention described herein, buffer manager 30 is able to read or write access a storage location within any one of memory banks A–H in four cycles of the CLOCK signal. That means that either SDRAM 1 or SDRAM 2 will read out a cell stored at an address referenced by a PTR1 or PTR2 memory address pointer within four cycles of a system clock signal after receiving a READ1, READ2, WRITE1 or WRITE2 pulse from buffer manager 30.

However the fact that each SDRAM 1 or 2 has a four cycle access time does not necessarily mean that buffer manager 30 will be able to read or write access each SDRAM 1 or 2 as frequently as once every four CLOCK signal cycles. Once any address of one of memory banks A—H is read or write accessed, that memory bank requires a certain amount of time to recover (precharge) before any address of that bank can be read or write accessed again. In the embodiment of the invention described herein, where each SDRAM has a four cycle access time, each memory bank A–H requires an additional six cycles to recover after a read access and an additional nine cycles to recover after a write access of any address within that memory bank. Thus buffer manager 30 would be able to read access the same one of memory banks A–H no more frequently than once every ten clock signal cycles and may write access the same memory bank no more frequently than once every 13 clock signal cycles. Also the SDRAM requires at least six cycles when transitioning between read and write access modes.

For example, suppose queue manager 32 determines that two cells stored in different addresses of bank A of SDRAM 1 must be forwarded from the switch port sequentially, one immediately following the other. If buffer manager 30 were to read those two cells sequentially out of bank A, then it would have to wait at least ten clock cycles after reading out the first cell before reading out the next cell. However instead of waiting the ten cycles to read the second cell out of bank A, buffer manager 30 read or write accesses one or more cells residing in other SDRAM banks and then reads the second cell out of bank A after bank A has had sufficient time to recover from the first read operation. Thus regardless of the order in which queue manager 32 tells buffer manager 30 to forward a sequence of cells it reads out of buffer memory 31, buffer manager 30 reads the sequence of cells out of buffer memory 31 in an order that optimize the rate it which it can access the buffer memory. Buffer manager 31 will also interleave the read accesses with a sequence of write accesses to the various SDRAM during each 60 cycle access period in a manner designed to optimize access rates.

Since the order in which buffer manager 30 reads a sequence of up to twelve cells out of buffer memory 31 during each 60 cycle access period may differ from the order in which queue manager 32 determined that sequence of cells should be forwarded from the switch port, buffer manager 30 sorts the cells it reads out of buffer memory 31 into the proper order before it forwards them onward. To read a cell out of one of SDRAMs 1 and 2, buffer manager 30 supplies the buffer memory address (PTR1 or PTR2) of the cell to SDRAM 1 or two 2 then pulses a READ1 or READ2 signal. That SDRAM 1 or 2 then reads out the cell to inputs of a set of twelve addressable registers 34(1)–34(12). Buffer manager 30 also forwards the VOQ data for that cell provided by queue manager 32 to inputs of registers 34(1)–34(12). Buffer manager 30 also generates a register address REG selecting one of registers 34(1)–34(12) and then, after generating the READ1 or READ2 pulse, the buffer manager pulses a LOAD signal to tell the register selected by the REG data to store both the VOQ data and the cell read out of buffer memory 31.

While buffer manager 30 reads the sequence of up to twelve cells out of SDRAMs 1 and 2 in an order in which SDRAMs 1 and 2 can most rapidly read out those cells, buffer manager 30 stores the cells and their associated VOQ data values in registers 34(1)–34(12) in the order in which queue manager 32 determined they should be forwarded to switch interface 24 of FIG. 2A. Thus each register 34(n) receives the nth cell of the sequence of up to twelve cells to be forwarded to the switch interface circuit 24.

When buffer manager 30 has read the cells out of buffer memory 31 and loaded them, along with their associated VOQ data values, into registers 34(1)–34(12), the buffer manager shifts the cells and VOQ data out of registers 34(1)–34(12) and into a FIFO output buffer 38 in the order in which they appear in the registers. The cells and VOQ data thus appear in output buffer 38 in the order that queue manager 32 determined they should be forwarded from the switch port. Whenever output buffer 38 is not empty, it provides its longest stored cell/VOQ data pair at its output and asserts a not empty signal NE2 input to a state machine 40. While the NE2 signal is asserted, state machine 40 periodically transmits a FORWARD signal to switch interface circuit 24 of FIG. 2A telling it to store the output cell/VOQ data pair of output buffer 38 and then pulses a shift out signal SO2 telling the output buffer to shift out (discard) the data pair. Thus output buffer 38 forwards cells to switch interface 24 in the order queue manager 32 determined they should be forwarded, regardless of the order in which buffer manager 30 decided to read them out of buffer memory 31.

Buffer Manager

Figure 4:
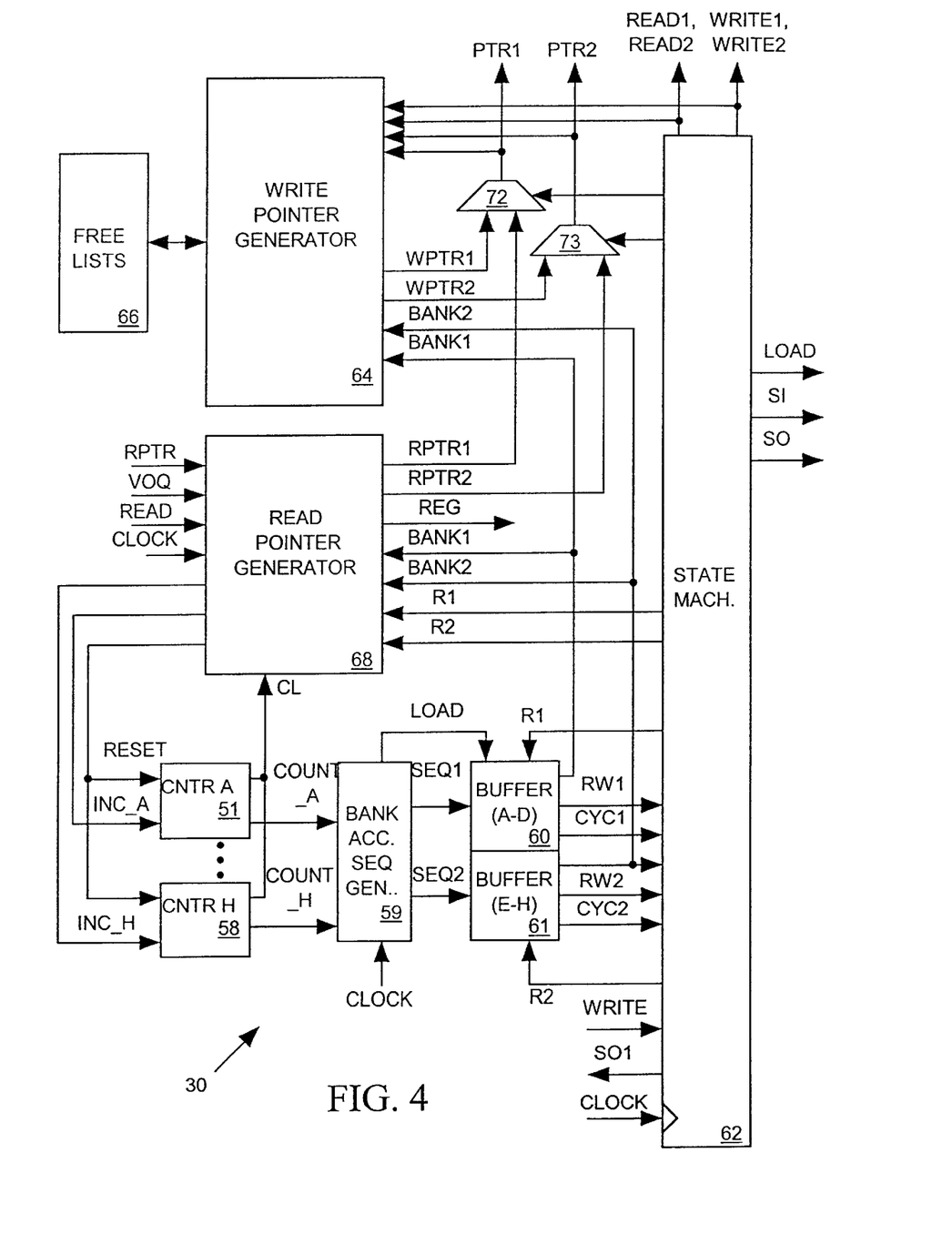
FIG. 4 illustrates the buffer manager of FIG. 3 in more detailed block diagram form.

FIG. 4 illustrates buffer manager 30 of FIG. 3 in more detailed block diagram form. Buffer manager 30 includes a "write pointer generator" (WPG) 64 which keeps track of the unoccupied storage locations in SDRAMs 1 and 2 (FIG. 3). Whenever buffer manager 30 is about to write a cell to an address of any one of SDRAM 1 banks A–D, or to any one of SDRAM 2 bank E–H, WPG 64 provides it as an output write pointer WPTR1 or WPTR2. Buffer manager 30 then uses that write pointer as the PTR1 or PTR2 input to SDRAM 1 or SDRAM 2 for the write access.

Whenever buffer manager 30 supplies a pointer PTR1 or PTR2 to a cell stored in one of SDRAMs 1 and 2 and pulses the READ1 or READ2 signal to tell the SDRAM to read out the cell, the READ signal pulse tells WPG 64 to append the PTR1 or PTR2 pointer to one of a set of eight "free lists" 66, each being a list of pointers to empty storage locations in SDRAMs 1 and 2 that are available for storing incoming cells. WPG 64 maintains the eight free lists 66 as linked lists in a random access memory, and each free list 66 lists pointers to all of the unoccupied storage locations within a separate one of SDRAM banks A–H (FIG. 3). Since a storage location becomes unoccupied whenever the cell it stores is read out of buffer memory 31, WPG 64 adds a pointer to one of free lists 66 whenever a cell is read out of SDRAM 1 or 2.

Buffer manager 30 also includes a read pointer generator (RPG) 68 which receives and stores the sequence of read pointers RPTR from queue manager 32 (FIG. 3) indicating the storage location of cells in SDRAMs 1 and 2 in the order in which those cells are to be forwarded from the input port. RPG 68 also stores the VOQ data accompanying each read pointer RPTR. The VOQ data indicates which output port 15 (FIG. 1) is to receive the cell referenced by the read pointer. Whenever buffer manager 30 is ready to read a cell out a particular bank A–H of SDRAM 1 or 2, RPG 68 supplies one of the input read pointers RPTR it previously received as an output read pointer RPTR1 or RPTR2 to that bank. Buffer manager 30 then uses the RPTR1 or RPTR2 pointer as the PTR1 or PTR2 pointer input to the SDRAM 1 or 2 to be read accessed.

At the start of every 60 cycle buffer access period, RPG 68 looks at a sequence of up to twelve of its longest-stored read pointers RPTR to determine which SDRAM bank A–H contains the storage location to which each RPTR pointer points. RPG 68 then stores each RPTR pointer and its accompanying VOQ data value in one of a set of eight internal queues, one for each bank A–H. RPG 68 also stores a REG data value in the queue with each RPTR pointer. The REG value indicates the order in which RPG 68 received that pointer relative to the other pointers of the sequence.

RPG 68 also controls a set of counters 51–58, one for each SDRAM bank A–H. Before sorting a sequence of up to 12 RPTR pointers into its internal queues, RPG 68 resets all counters 51–58. Thereafter, as it sorts the RPTR pointers into the queues, RPG 68 signals each counter 51–58 via one of signals INC_A–INC_H to increment its count once for each of the RPTR pointers that points into the counter's corresponding SDRAM bank. Thus after the sequence of up to 12 RPTR pointers have been sorted into queues, counters 51–58 will indicate the number of times buffer manager 30 must thereafter read access each of SDRAM banks A–H in order to read out all of the up to twelve cells referenced by queued RPTR pointers. During a next 60 cycle period, buffer manager 30 reads out of SDRAMS 1 and 2 the cells referenced by the up to 12 read pointers RPG 68 queued during the preceding 60 cycle period.

RPG 68 normally attempts to queue 12 read pointers RPTR during each 60 cycle period if its internal FIFO buffer is currently storing at least 12 read pointers to be queued. However to allow for sufficient time for bank recovery and read/write transitions within the same SDRAM, it is preferable to limit the number of read accesses to the same bank during each 60 cycle period to five. Thus each counter 51–58 has a count limit of five, and when it reaches its count limit, it asserts a count limit input signal (CL) to RPG 68 to tell RPG 68 to stop queuing read pointers. Thus while RPG 68 normally queues 12 read pointers during each 60 cycle period, in some cases it will stop queuing read pointers for that period when the queue for any one SDRAM bank has received five read pointers.

The count outputs of counters 51–58 address a "bank access sequence (BAS) generator" 59. After all of the up to 12 RPTR pointers have been queued, BAS generator 59 determines from the count outputs of counters 51–58 an order in which buffer manager 30 is to read access the various SDRAM banks during a next 60 cycle period when reading from the storage locations referenced by the queued RPTR pointers. It also determines an order in which buffer manager 30 may write cells residing in write buffer 29 (FIG. 3) into the SDRAM banks during that 60 cycle period. BAS generator 59 also determines the access time that buffer manager 30 is to allocate to each read or write access. Bank access generator 59 produces two set of data SEQ1 and SEQ2, and signals one buffer 60 to load the SEQ1 data set and signals another buffer 61 to load the SEQ2 set. The SEQ1 data BAS generator 59 loads into buffer 60 indicates the order in which buffer manager 30 is to read and write access banks A–D of SDRAM 1 while the SEQ2 data stored in buffer 61 indicates the order in which the buffer manager is to read and write accesses banks E–H of SDRAM 2 during the next 60 cycle period.

The SEQ1 data sequence is loaded in one cycle into to buffer 60 but buffer 60 later reads it out as a data sequence having up to 14 successive elements. Each element of the SEQ1 sequence has three fields. A BANK1 field references one of banks A–D of SDRAM 1 that may be read or write accessed, an single bit RW1 field indicates whether the bank is to be read or a write accessed, and a CYC1 field indicates the number of clock cycles buffer manager 30 is to allow for the read or write access. Each of the up to 14 elements of the SEQ2 data sequence loaded into buffer 61 is organized into a similar set of three fields, BANK2, RW2 and CYC2 indicating the bank E–H of SDRAM 2 to be accessed, whether the access is a read or write access, and the number of cycles allowed for the access.

Bank access sequencer 59 configures the SEQ1 and SEQ2 data sequences to efficiently sequence the SDRAM 1 and SDRAM 2 bank read and write access so that during the next 60 cycle period, buffer manager 30 will read access all of the up to 12 storage locations referenced by the pointers RPG 68 has queued during the preceding 60 cycle period and will also perform as many buffer memory 31 write operations as possible.

At the start of the next 60 cycle period, a state machine 62 looks at the RW1 output field of the first element of SEQ1 sequence stored in buffer 60 to determine whether it is to next read or write access SDRAM 1. If the RW1 field indicates a write access, state machine 62 looks at the WRITE signal produced by queue manager 32 (FIG. 3) to determine whether write buffer 29 (FIG. 3) is currently storing a cell to be written into the buffer memory. If not, state machine 62 simply waits the number of cycles indicated by the CYC1 field and then signals buffer 60 via the R1 signal to shift the next sequence element. No write operation takes place. WPG 64, which receives the BANK1 field output of buffer 60 indicating which of SDRAM 1 banks A–D is to store the cell, produces a pointer WPTR1 to an available storage location within that bank. When the WRITE signal indicates a cell is available in write buffer 29, state machine 62 sets a multiplexer 72 to pass that WPTR1 pointer as the PTR1 input to SDRAM and then pulses the WRITE1 signal telling SDRAM 1 to store the cell at the output of write buffer 29 in the storage location referenced by the PTR1 pointer.

After initiating the write operation, state machine 62 waits until the number of cycles indicated by the CYC1 output field of buffer 60 have elapsed, and then signals buffer 60 to shift out the next sequence element.

When the RW1 data output of buffer 60 indicates that a read operation is to be performed on SDRAM 1, state machine 62 sends an R1 signal pulse to RPG 68 telling it to provide a read pointer (RPTR1) to a cell currently stored in the particular SDRAM1 bank A–D identified by the current BANK1 output of buffer 60. RPG 68 then supplies the next RPTR pointer from the internal pointer queue corresponding to that bank as its output RPTR1 pointer. RPG 68 also supplies an output REG value indicating which of registers 34(1)–34(12) of FIG. 3 is to receive the cell when it is read out of SDRAM 1. State machine 62 sets multiplexer 72 to select the RPTR1 output of RPG 68 as the PTR1 pointer input to SDRAM 1 and then pulses the READ1 signal to tell SDRAM 1 to read out the cell and to tell WPG 64 to add the current PTR1 pointer to the appropriate free list 66. Four cycles thereafter state machine 62 signals the register 34(1)–34(12) identified by the REG data to load the cell. The current CYC1 data output of buffer 60 tells state machine 62 how long to wait before telling buffer 60 to shift out a next SEQ1 data sequence element for controlling a next SDRAM 1 access.

State machine 62 operates in a similar manner to read and write access SDRAM 2 in response to successive elements of the SEQ2 sequence read out of buffer 61 using a multiplexer 73 to control whether a write pointer WPTR2 out of WPT 64 or a read pointer RPTR2 output of RPG 68 is to be supplied as the PTR2 input to SDRAM 2.

At the end of the 60 cycle period, state machine 62 signals the registers 34(1)–34(12) (FIG. 3) that received data read out of SDRAMS 1 and 2 to shift out their cells and accompanying VOQ data to output buffer 38 and signals output buffer 38 to shift in the cells and VOQ data. Thereafter state machine 40 forwards the cells and VOQ data to switch interface 24 of FIG. 2A.

Read Pointer Generator

Figure 5:
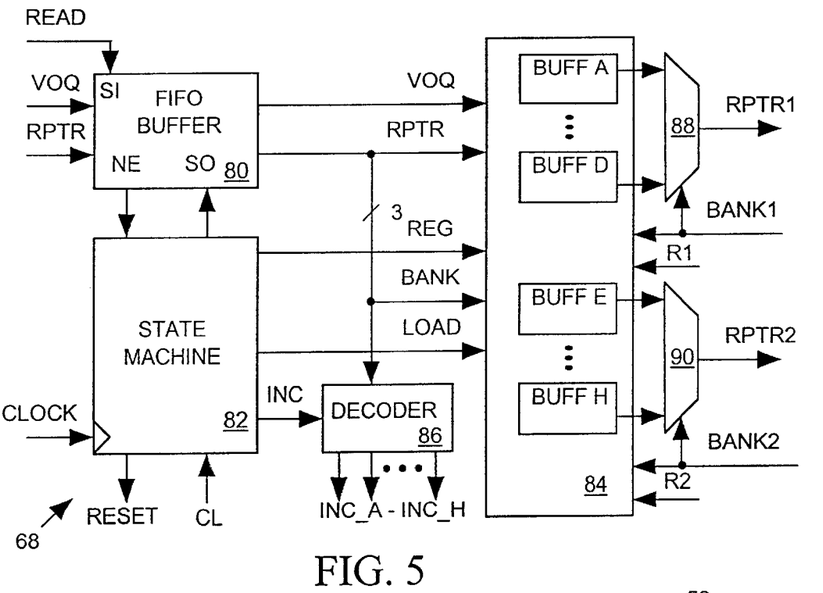
FIG. 5 illustrates the read pointer generator of FIG. 4 in more detailed block diagram form.

FIG. 5 illustrates read pointer generator 68 of FIG. 4 in more detailed block diagram form. RPG 68 includes a FIFO buffer 80 which shifts in a RPTR/VOQ pair from queue manager 32 in response to each pulse of the READ signal. FIFO buffer 80 signals a state machine 82 when it is not empty. During each 60 cycle period, state machine 82 shifts up to twelve VOQ/RPTR pairs from FIFO buffer 80 into one of a set of eight FIFO buffers 84, each implementing a read pointer queue corresponding to a separate one of banks A–H of SDRAMs 1 and 2. The first three bits of the read pointer RPTR indicate the particular bank A–H the pointer points to, and those bits control which buffer 84 receives the RPTR/ VOQ pair. State machine 82 supplies a REG data value to be stored with the RPTR/VOQ data pair indicating the order in which the pair occurred in FIFO buffer 80 with respect to the up to 12 other RPTR/VOQ pairs loaded into buffers 84 during the 60 cycle period. State machine 82 sends a LOAD signal to buffers 84 to indicate when the particular buffer selected by the three BANK bits is to load the RPTR, VOQ and REG data. A decoder 86 decodes the BANK bits in response to an INC signal pulse output of state machine 82 to supply an appropriate INC_A–INC_H signal to one of counters 51–58 of FIG. 4. State machine 82 stops shifting RPTR/VOQ data pairs out of FIFO buffer 80 during each 60 cycle period when it has reached the 12 pair limit or when any of counters 51–58 assets count limit signal CL.

The outputs of buffers 84 corresponding to banks A–D supply inputs to a multiplexer 88 controlled by the BANK1 data from buffer 60 of FIG. 4. The SDRAM1 read pointer RPTR1 appears at the output of multiplexer 88. BANK1 signal also selects one of the buffers 84 corresponding to banks A–D and the R1 signal from state machine 62 of FIG. 4 tells the selected buffer to shift out its longest stored data. Similarly, the outputs of buffers 84 corresponding to banks E–H supply inputs to a multiplexer 90 controlled by the BANK2 data from buffer 61 of FIG. 4, and multiplexer 90 provides the SDRAM 2 read pointer RPTR2. The R2 signal from state machine 62 tells one of the buffers 84 corresponding to banks E–H selected by the BANK2 data to shift out its longest stored data.

Bank Sequencer

Figure 6:
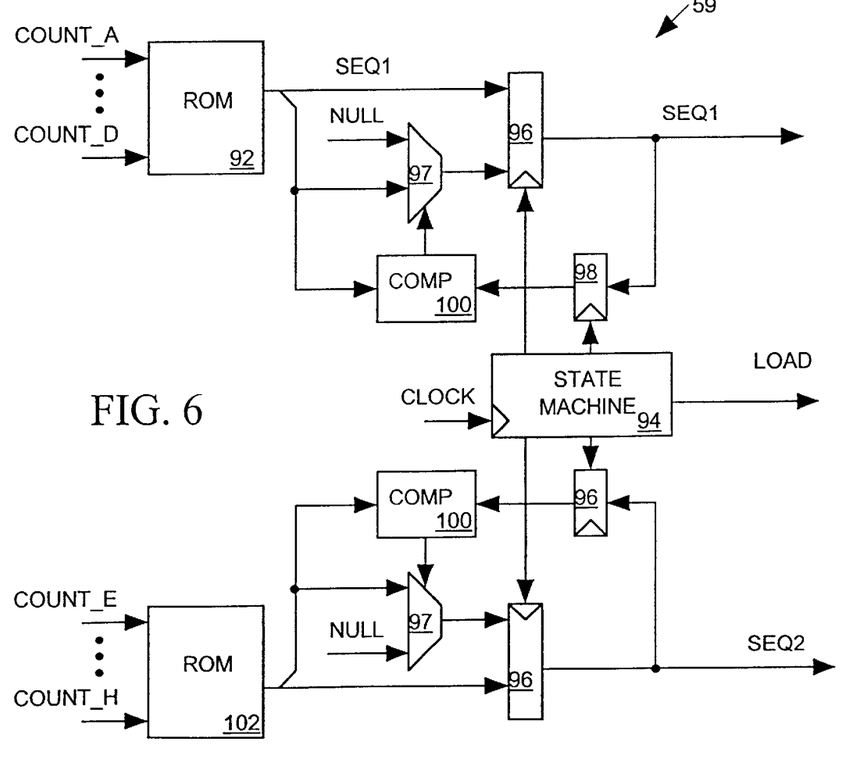
FIG. 6 illustrates the bank access sequencer of FIG. 4 in more detailed block diagram form, and FIG. 7 illustrate the write pointer generator of FIG. 4 in more detailed block diagram form.

FIG. 6 illustrates bank access sequence (BAS) generator 59 of FIG. 4 in more detailed block diagram form. BAS generator 59 includes a read only memory 92 addressed by the COUNT_A–COUNT_D outputs of counters 51–54 (FIG. 4) which keep track of the number of read accesses to be performed on banks A–D. Each ROM 92 address stores an read/write sequence SEQ1 that may be supplied to buffer 60 that optimizes SDRAM 1 read and write access rates for the given combination of counter 51–54 outputs that address it.

For example, when COUNT_A=1 and COUNT_B= COUNT_C=COUNT_D=0 a suitable output sequence SEQ1 from ROM 92 might be as follows:

W4B W4A W4D W4C W4B W4A W4D W4C W4B W4A W4D W4C W6B R6A

In this sequence, a "W" represents a write operation, an "R" represents a read operation, an "A", "B", "C" or "D" references the bank to be accessed, and a number such as 4, 6 or 12 references a 4, 6 or 12 cycle access time. Thus, for example, a "W4B" code indicates a sequence element referencing a 4 cycle write operation to bank B while a "R6C" code indicates a sequence element referencing a 6 cycle write operation to bank C.

The sequence tells state machine 62 (FIG. 4) to perform 12 write accesses to banks A–D at four cycle intervals, to perform a final 6 cycle write access to bank B, and to then perform a 6 cycle read access of bank A. The last write access is allowed six cycles instead of four to provide the required extra two cycles needed for transitioning from a write to a read access. Note that the access times add up to 60 cycles.

A state machine 94 loads the SEQ1 output of ROM 92 into a register 96 at the start of each 60 cycle period which delivers the SEQ1 sequence to buffer 60 (FIG. 4) at the start of the next 60 cycle period to control the order of SDRAM bank during that period. A register 98 holds the last element of the SEQ1 sequence that was loaded into buffer 60 at the start of the current 60 cycle period. Thus the element in register 98 indicates which bank A–D will be last accessed during the current 60 cycle period. A comparison circuit 100 compares the element stored in register 98 to the first element of the SEQ1 sequence at the output of ROM 92 to determine whether the CYC1 field of the SDRAM element in register 98 allows SDRAM 1 a sufficient number of cycles to recover from the read or write operation it specifies to permit the read or write operation specified by the first element of the SEQ1 sequence produced by ROM 92.

For example, suppose the SEQ1 sequence element in register 98 references a six cycle read operation to be carried out on bank A. Since only six cycles are allowed, then the first element of the SEQ1 sequence for the next 60 cycle period should not specify a read or write operation to bank A because bank A cannot recover from a read operation in six cycles. However the first element of the SEQ1 sequence can specify a read or write operation on any other bank B–D.

Thus in the preferred embodiment of the invention, each SEQ1 sequence stored in ROM 92 starts with an element referencing a 4 or 6 cycle memory write operation. When compare circuit 100 (suitably a small ROM-based lookup table) determines that the first element of the SEQ1 sequence output of ROM 92 specifies a write operation that is incompatible with the action specified by the element in register 98, comparator 100 signals a multiplexer 97 to replace the RW1 field of the first element of the SEQ1 output of ROM 92 with a NULL code before the sequence is loaded into register 98. The NULL code 62 tells state machine 62 to refrain from accessing SDRAM for the number of cycles indicated by the CYC1 field of the first element. This ensures that the memory access action referenced by the second element of the SEQ1 sequence loaded into register 96 will be compatible with the action referenced by the last element of the SEQ1 sequence currently being executed.

For example suppose the element in register 98 indicates bank B is to be written in six cycles and the current SEQ1 sequence output of RAM 92 is as follows:

W4B W4A W4D W4C W4B W4A W4D W4C W4B W4A W4D W4C W6B R6A

The first element of the SEQ1 sequence (a 4 cycle write to bank B would be incompatible with the operation specified by the element in register 98 (a six cycle write to bank B) since it is not possible to perform two writes to bank B six cycles apart. Thus compare circuit 100 would signal multiplexer 97 to replace the RW1 field of the first element of the SEQ1 output of ROM 92 with the NULL code before state machine 94 loads the SEQ1 sequence into register 96. In such case the write to bank A operation described by the second element of the SEQ1 sequence occurs with sufficient delay (10 cycles) following the bank B write operation described by the element in register 98.

Since the read count outputs of counters 51–54 of FIG. 4 may reference from 0 to 12 read operations for all banks A–D but not more than 5 read operations on the same bank, ROM 92 must store several hundred sequences, one for each possible combination of counter outputs. Generally the read and write operations of each sequence should be ordered and timed to include as many write operations in each sequence as possible given the required number of read operations for each bank while allowing a sufficient delay between successive operations. Also the write operations should be sequenced to maximize the probability that cells of the same packet will be well-distributed among the memory banks. Many sequencing schemes are possible. The following sequences corresponding to each of a few representative combinations of read count outputs of counters 51–54.

W4B W4A W4D W4C W4B W4A W4D W4C W4B W4A W4D W16C [1]

W4B W4A W4D W4C W4B W4A W4D W4C W4B W4A W4D W4C W6B R6A [2]

W6B R6A W6C R6A W6B R6A W6C R6A W6B R6A [3]

W4A W4D W4B W6C R6A W6B R6A W6C R6A R4B R6A [4]

W4A W4D W4B W4C W4A W4D W4B W6C R6A R4B R6A R4B R6A [5]

W4C W6B R6A W6C R6A R4B R6A R4B R6A R4B R6A [6]

W4C W4B W4A W4D W4C W4B W4A W4D W4C W6B R4A R4C R4B R6A [7]

W6B R6A W6C R6A W6B R4A R4C R4B R6A R4B R6A [8]

W6C R4B R4A R4C R4B R4A R4C R4B R6A R4B R6A R4B R6A [9]

W4D W4C W4B W4A W4D W4C W6B R4A R4D R4C R6A R4B R6A [10]

W4A W4D W4B W6C R6A W6B R4A R4D R4C R6A R4B R6A [11]

W6C R4B R4A R4D R4B R4A R4C R4B R6A R4B R6A R4B R6A [12]

W4A W4D W4C W6B R4A R4C R4B R4A R4D R4C R6A R4B R6A [13]

W4A W6C R4B R4A R4C R4B R4A R4C R4B R4A R4D R4C R4B R6A [14]

W4C W6B R4A R4D R4C R4A R4D R4C R6A R4B R6A R4B R6A [15]

W4D W4B W6A R4C R4B R4A R4D R4C R4B R4A R4D R4C R4B R6A [16]

W4B W6A R4D R4C R4B R4A R4D R4C R4B R4A R4D R4C R4B R6A [17]

In the preferred embodiment of the invention all sequences start with a four or six cycle write operation and all sequences other than sequence [1] end with a read operation. Since ROM 92 produces only sequence [1] when there are no read operations, only that sequence must end with a write operation. When the last element of a sequence being executed specifies a read operation, then the next sequence element to be executed may be either a read or a write operation to the same SDRAM bank provided that it occurs no sooner than ten cycles later. Thus if the 4 or 6 cycle write operation specified by the first element of a sequence happens to be directed to the same bank as the 6 cycle read operation specified by the last element of the preceding sequence, compare circuit 100 may replace write operation code of the first element with a 4 or 6 cycle NULL code. The 6 cycles specified by the preceding write operation and the 4 or 6 cycles specified by a starting NULL operation would then combine to provide a 10 or 12 cycle delay, sufficient for back-to-back read/write or read/read operations on the same bank.

ROM 92 produces sequence [1] specifying three write operations to each of banks A–D when there are no read operations. While it would be possible to perform up to three more bank write operations in the allotted 60 cycle period, cells would be unevenly distributed among the banks. Generally write accesses should be ordered in the SEQ1 sequence so that to the extent possible cells are successively written in round-robin fashion to banks A–D. Since successively written cells are likely to belong to the same packet sequence, this helps to reduce the likelihood that queue manager 32 will later request several cells in a row to be forwarded from the same SDRAM bank.

Bank access sequencer 59 of FIG. 6 also includes a ROM 102 addressed by the COUNT_E–COUNT_D output of counter 55–58, register 104 for receiving the SEQ2 output of ROM 102, and comparator 108 and register 110 operated by state machine 94 for supplying the SEQ2 sequence input to buffer 61 of FIG. 4 in a manner similar to the manner in which the SEQ1 sequence is produced.

Write Pointer Generator

Figure 7:
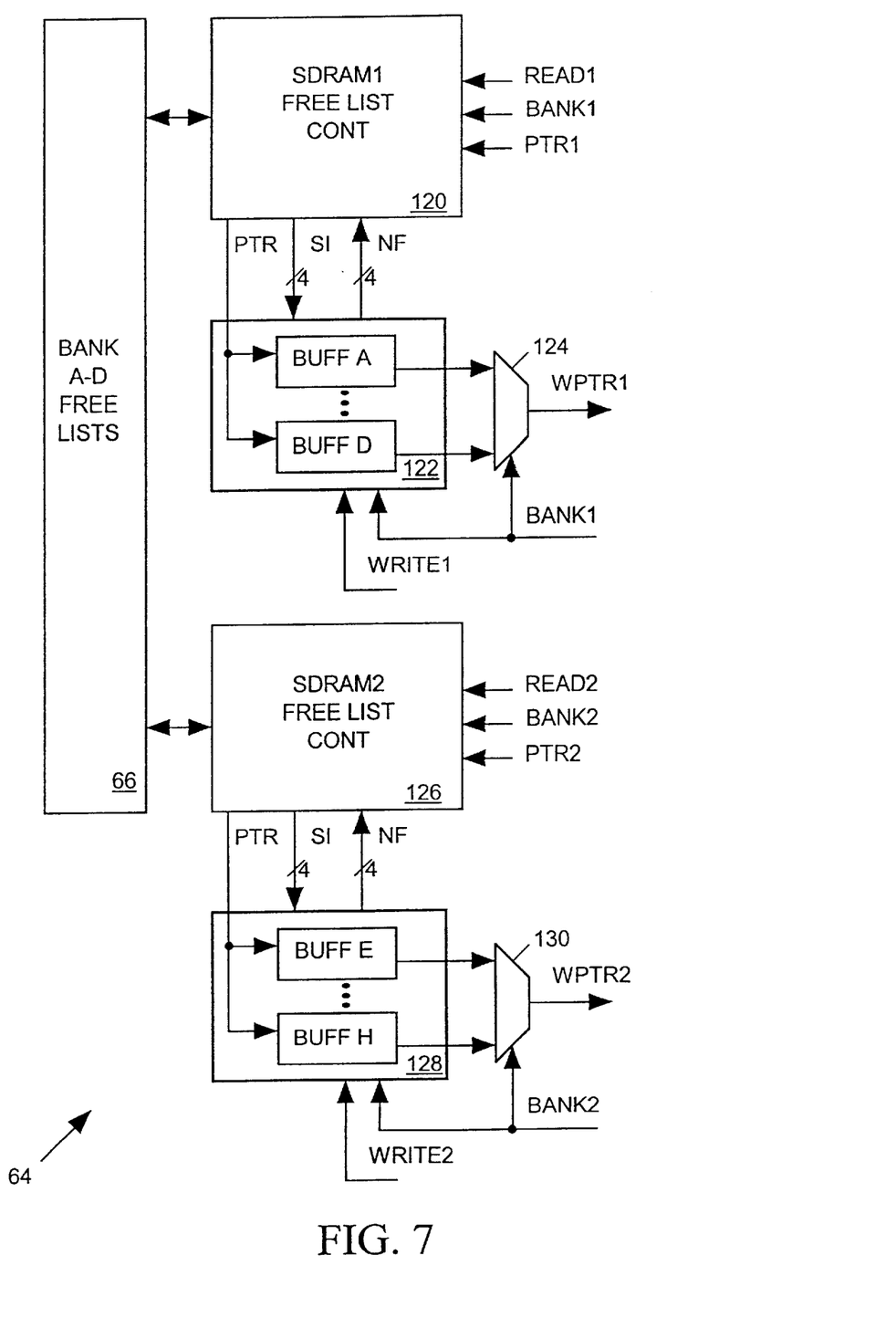

FIG. 7 illustrates write pointer generator 64 of FIG. 4 in more detailed block diagram form. WPG 64 includes an SDRAM1 free list controller 120 which responds to each pulse of the READ 1 signal from state machine 62 by appending the current PTR1 output of multiplexer 72 (FIG. 4) to one of free lists 66 associated with the particular SDRAM bank A–D identified by the BANK1 output of buffer 60 (FIG. 4). WPG 64 also includes a set of four FIFO buffers 122, each corresponding to a separate one of banks A–D. When any one of buffers 122 corresponding to one of banks A–D is not full it pulses an input signal (NF) to free list controller 120. Controller 120 responds to an NF signal from any of buffers 122 by removing a pointer PTR from a corresponding free list 66 and shifting it into that buffer 122. The pointer outputs of buffers 122 drive inputs of a multiplexer 124 which responds to the BANK1 output of buffer 60 of FIG. 4 by selecting one of the buffer outputs as the write pointer WPTR1 supplied to multiplexer 72 (FIG. 4). The BANK1 signal also selects one of buffers 122, and when state machine 62 pulses the WRITE1 signal, the selected buffer 122 shifts out (discards) its current output pointer.

WPG 64 also includes a free list controller 126 similar to controller 120 for appending the PTR2 pointer output of multiplexer 73 to one of the free lists 66 associated with banks E–H in response to the READ2 and BANK2 signals, and for shifting pointers from free lists 66 into a set of four buffers 128 providing write pointers for banks E–H. A multiplexer 130 selects a write pointer output WPTR2 of one of buffers 128 to multiplexer 73 of FIG. 4 in response to the BANK2 data and WRITE2 signals.

Thus has been shown and described a buffer manager 30 (FIG. 3) within the traffic manager 22 of a network input switch port 14 (FIG. 2A) for writing incoming cells into buffer memory 31 and for thereafter reading the cells out of the buffer memory and forwarding them to switch interface 24. A similar buffer manager is employed in the traffic manager 26 (FIG. 2B) for receiving cells from switch interface 25, storing them in a buffer memory and thereafter forwarding them to protocol processor 28.

While a queue manager 32 (FIG. 3) determines an order in which buffer manager 30 is to forward cells read out of buffer memory 31 and supplies the buffer manager with a sequence of read pointers ordered to indicate an order in which buffer manager 30 is to forward the set of cells, buffer manager 30 reorders the read pointers in the pointer sequence and adds write pointers to optimize the rate at which it read and write accesses the various banks of buffer memory 31. However as it reads cells out of buffer memory 31, buffer manager 30 loads them into registers 34(1)–34 (12) and then forwards them in the order in which queue manager 32 determined the cells should be forwarded.

While the forgoing specification has described preferred embodiment(s) of the present invention, one skilled in the art may make many modifications to the preferred embodiment without departing from the invention in its broader aspects. For example while the buffer manager 30 described herein is designed to efficiently read and write access two SDRAMs 1 and 2 each having four banks, those of skill in the art will appreciate that the invention could be practiced with only one SDRAM, with more than two SDRAMS, with SDRAMs having other numbers of banks, and with memories other than SDRAMs for which the frequency in which the memory can be accessed is a function of the order in which its banks or other groups of memory addresses are read and write accessed. Also while the SDRAMs 1 and 2 employed in the preferred embodiment of the invention are described herein as having specific timing limitations such as, for example, four cycle bank access times and six or nine cycle bank recovery times, it should be understood that the invention may be practiced with memories having different values of such timing limitations. The appended claims therefore are intended to cover all such modifications as fall within the true scope and spirit of the invention.

What is claimed is:

1. An apparatus for read and write accessing a buffer memory, wherein the buffer memory has a plurality of storage locations, each for receiving, storing and reading out a data cell, the apparatus comprising:

first means for receiving and responding to a first sequence of read pointers by creating a second sequence including the read pointers of the first sequence, wherein each read pointer references a separate one of the buffer memory's storage locations and wherein the read pointers appear within the first sequence in a first order and appear in the sequence in a second order differing from the first order; and second means for receiving and responding to the second sequence by causing the storage locations referenced by the read pointers to read out their cells in the second order in which the read pointers appear in the second sequence.

2. The apparatus in accordance with claim 1
   wherein an average rate at which the buffer memory's storage locations are capable of reading out data cells varies in accordance with an order in which the buffer memory's storage locations read out cells, and
   wherein the first means selects the second order to optimize the average rate at which the second means causes the buffer memory's storage locations to read out the data cells.

3. The apparatus in accordance with claim 1 further comprising
   third means for receiving and storing the cells the storage locations read out, and for thereafter forwarding those cells in accordance with the first order in which the plurality of read pointers referencing those storage locations appeared in the first sequence.

4. The apparatus in accordance with claim 2 further comprising
   third means for receiving and storing the cells the storage locations read out, and for thereafter forwarding those cells in accordance with the first order in which the plurality of read pointers referencing those storage locations appeared in the first sequence.

5. The apparatus in accordance with claim 1 wherein the first means also includes write pointers in the second sequence, each write pointer referencing a separate storage location within the buffer memory, and wherein said second means also causes the buffer memory storage locations referenced by the write pointers included in the second sequence to receive and store data cells.

6. The apparatus in accordance with claim 5
   wherein an average rate at which the buffer memory's storage locations are capable of receiving, storing and reading out data cells varies in accordance with an order in which the second means causes the buffer memory's storage locations to receive, store and read out cells, and
   wherein the first means selects the second order and chooses the write pointers included in the second sequence to optimize the rate at which the buffer memory's storage locations read out the data cells.

7. The apparatus in accordance with claim 5 further comprising
   third means for receiving and storing the cells the storage locations read out, and for thereafter forwarding those cells in accordance with the first order in which the plurality of read pointers referencing those storage locations appeared in the first sequence.

8. The apparatus in accordance with claim 6 further comprising
   third means for receiving and storing the cells the storage locations read out, and for thereafter forwarding those cells in accordance with the first order in which the plurality of read pointers referencing those storage locations appeared in the first sequence.

9. A traffic manager for a network switch for receiving, storing and forwarding data cells, the traffic manager comprising:

a buffer memory having a plurality of storage locations, each for receiving, storing and reading out a data cell;

first means for receiving and responding to each of successive first sequences of read pointers by creating a separate second sequence including the read pointers of the first sequence, wherein each read pointer references a separate one of the buffer memory's storage locations and wherein the read pointers appear within the first sequence in a first order and appear in the sequence in a second order differing from the first order;

second means for receiving and responding to the second sequence by causing the storage locations referenced by the read pointers to read out their cells in the second order in which the read pointers appear in the second sequence; and third means for receiving and storing the cells the storage locations read out, and for thereafter forwarding those cells in accordance with the first order in which the plurality of read pointers referencing those storage locations appeared in the first sequence.

10. The traffic manager in accordance with claim 9
    wherein an average rate at which the buffer memory's storage locations are capable of reading out data cells varies in accordance with an order in which the buffer memory's storage locations read out cells, and
    wherein the first means selects the second order to optimize the average rate at which the second means causes the buffer memory's storage locations to read out the data cells.

11. The traffic manager in accordance with claim 9 wherein the first means also includes write pointers in the second sequence, each write pointer referencing a separate storage location within the buffer memory, and wherein said second means also causes the buffer memory storage locations referenced by the write pointers included in the second sequence to receive and store data cells.

12. The traffic manager in accordance with claim 11
    wherein an average rate at which the buffer memory's storage locations are capable of receiving, storing and reading out data cells varies in accordance with an order in which the second means causes the buffer memory's storage locations to receive, store and read out cells, and
    wherein the first means selects the second order and chooses the write pointers included in the second sequence to optimize the rate at which the buffer memory's storage locations read out the data cells.

13. The traffic manager in accordance with claim 11 further comprising queue manager means for monitoring said second means to determine which buffer memory storage locations receive and store data cells, for determining a forwarding order in which cells stored in the buffer memory storage locations are to be forwarded from the traffic manger, and for generating and supplying the successive first sequences of read pointers to said first means, the first order of each sequence being selected in accordance with the determined forwarding order.

14. A method for receiving cells, writing them into a buffer memory, and then reading the cells out of the buffer memory and forwarding them, wherein the buffer memory has a plurality of storage locations, each for receiving, storing and reading out a data cell, wherein an average rate at which the buffer memory's storage locations are capable of receiving, storing and reading out data cells varies in accordance with an order in which the buffer memory's storage locations can be read and write accessed, the method comprising the steps of:

generating a first sequence of read pointers, wherein each read pointer references a separate one of the buffer memory's storage locations storing a cell to be read out and forwarded;

processing the first sequence to produce a second sequence including the read pointers of the first sequence, wherein the read pointers appear within the first sequence in a first order and appear in the sequence in a second order differing from the first order; and responding to the second sequence by causing the storage locations referenced by the read pointers to read out their cells in the second order in which the read pointers appear in the second sequence.

15. The method in accordance with claim 14 further comprising the steps of:

storing the cells read out of the storage locations in cell storage means, and forwarding cells out of the cell storage means in accordance with the first order in which the plurality of read pointers referencing the buffer memory storage locations of the cells appeared in the first sequence.

16. The method in accordance with claim 14 wherein the second order optimizes the average rate at which the buffer memory's storage locations can read out the data cells referenced by the read pointers.

17. The method in accordance with claim 14 wherein the second sequence also includes a plurality of write pointers, each write pointer referencing a separate storage location within the buffer memory, and wherein the method further comprises the step of causing the buffer memory storage locations referenced by the write pointers included in the second sequence to receive and store data cells.

18. The method in accordance with claim 17 wherein the second order and the write pointers included in the second sequence are selected to optimize the rate at which the buffer memory's storage locations can be read and write accessed.

19. The method in accordance with claim 18 further comprising the steps of:

storing the cells read out of the storage locations in cell storage means, and forwarding cells out of the cell storage means in accordance with the first order in which the plurality of read pointers referencing the buffer memory storage locations of the cells appeared in the first sequence.

* * * * *